UNITED STATES PATENT OFFICE.

CECIL NAPIER HAKE, OF WESTMINSTER, ENGLAND.

PROCESS OF MAKING AMMONIUM NITRATE.

SPECIFICATION forming part of Letters Patent No. 400,207, dated March 26, 1889.

Application filed November 21, 1888. Serial No. 291,488. (No specimens.)

*To all whom it may concern:*

Be it known that I, CECIL NAPIER HAKE, consulting chemist, of 14 Great Smith Street, in the city of Westminster, England, have invented new and useful Improvements in the Manufacture of Nitrate of Ammonia, of which the following is a full, clear, and exact description.

A common method of producing nitrate of ammonia is to bring together commercial liquid nitric acid and commercial liquid ammonia, so that a solution of nitrate of ammonia is obtained, from which the salt may be extracted by crystallization and evaporation. This method has many practical disadvantages which it is the object of my invention to obviate. Among others, the nitrate is produced in a more or less dilute solution, which has to be evaporated in a costly manner to produce the dry substance.

My invention consists in producing nitrate of ammonia in a dry or solid form or state of powder by combining nitric-acid vapor with ammonia-gas or ammonia-gas with commercial liquid nitric acid in the form of a fine spray under such conditions that the temperature caused by the combination does not rise sufficiently high to produce chemical decomposition—that is, to a temperature over 120° centigrade.

According to my first method, the gases are conducted to a chamber filled with air, where the two gases mix together and combine to form nitrate of ammonia, which falls down in the state of a fine powder, the atmospheric air reducing the temperature within safe limits. The ammonia-gas may be dried by passing over quicklime before passing it into the mixing-chamber.

According to the second method, the nitric acid may be sprayed into the mixing-chamber, into which a current of ammonia-gas is at same time flowing, care being taken not to admit sufficient of the acid and ammonia at one time to raise the temperature beyond the above-mentioned safe limit. The mixing-chamber is constructed of stone, lead, or other suitable material capable of resisting the chemical action of the ingredients used. If fairly dry gases be used, the nitrate of ammonia is produced in the form of a fine powder; but if moisture be present it is produced in a supersaturated liquid form, which solidifies on cooling. A condenser containing an acid by preference is attached to the outlet of the mixing-chamber, by which any escaping gas may be caught. In carrying out this process the flow of the gases should be regulated in such manner that as near as possible equivalent proportions of the two ingredients should be present in the mixing-chamber; but it is advantageous in practice to admit a slight excess of ammonia. It is also desirable to blow a current of air through the nitric-acid generator in such a way as to give a decided flow to the gas and at the same time to dilute it when it comes into contact with the ammonia-gas.

Having now particularly described and ascertained the nature of my said invention and in what manner the same is to be performed, I declare that what I claim is—

The process of making nitrate of ammonia in a dry or solid form or state of powder by bringing together in either of the ways herein specified nitric acid and ammonia so as to effect their direct combination while both are in a gaseous or finely-divided form, and under such circumstances that the temperature caused by the combination does not rise sufficiently high to produce simultaneous decomposition of the nitrate of ammonia.

The foregoing specification of my improvements in the manufacture of nitrate of ammonia signed by me this 6th day of November, 1888.

CECIL NAPIER HAKE.

Witnesses:
 G. F. WARREN,
 PERCY K. WOODWARD.